United States Patent [19]

Tacke et al.

[11] Patent Number: 4,499,237
[45] Date of Patent: Feb. 12, 1985

[54] POLYCARBONATE-POLYOLEFIN MOULDING COMPOSITIONS

[75] Inventors: Peter Tacke, Krefeld; Helmut Korber, Odenthal; Josef Merten, Korschenbroich; Dieter Neuray, Krefeld, all of Fed. Rep. of Germany

[73] Assignee: Bayer Aktiengesellschaft, Leverkusen, Fed. Rep. of Germany

[21] Appl. No.: 180,334

[22] Filed: Aug. 22, 1980

[30] Foreign Application Priority Data

Aug. 27, 1979 [DE] Fed. Rep. of Germany ....... 2934538

[51] Int. Cl.$^3$ .............................................. C08L 69/00
[52] U.S. Cl. .......................................... 525/67; 525/68
[58] Field of Search ................................... 525/67, 68

[56] References Cited

U.S. PATENT DOCUMENTS 3,989,770 11/1976 Prinz et al. ............................. 525/67
4,206,155 6/1980 Korber ................................. 525/301

FOREIGN PATENT DOCUMENTS 2734105 1/1979 Fed. Rep. of Germany ...... 525/298

*Primary Examiner*—Jacob Ziegler
*Attorney, Agent, or Firm*—Connolly and Hutz

[57] ABSTRACT

A mixture comprising 1. from 70 to 99% by weight of a predominantly aromatic polycarbonate; and 2. from 30 to 1% by weight of a polyolefin graft polymer of (a) 70 to 95% by weight of a graft base consisting of a homopolymer of aliphatic and/or aromatic monoolefins or of a copolymer of these olefins, and up to 50% by weight of other monoolefinically unsaturated, radially polymerizable compounds and/or up to 5% by weight of diolefins, and (b) 5 to 30% by weight of at least one graft-polymerizable vinyl compound, the olefin graft polymers having been obtained by contacting a melt of the graft base (a) with oxygen or an oxygen-containing gas for at most 10 min. with intensive mixing under a pressure of from 1 to 150 bars and at a temperature of from 80° C. to 300° C., adding the vinyl compounds (b) to be grafted on immediately afterwards with intensive mixing in the absence of oxygen or oxygen-containing gas and removing the residual monomers after the graft polymerization reaction.

7 Claims, No Drawings

POLYCARBONATE-POLYOLEFIN MOULDING COMPOSITIONS

This invention relates to moulding compositions of mixtures of polycarbonates of aromatic dihydroxy compounds and olefin graft polymers.

It is known to improve the mechanical properties of polycarbonates by incorporating polyolefins such as polyethylene and polypropylene. Mixtures of this kind are described in German Offenlegungsschriften Nos. 1,146,251 and 1,694,664. However, the polyolefins are incompatible with the polycarbonate so that the moulding compositions are inhomogeneous and mouldings produced from them show surface blemishes and poor weld line strength.

Weld lines always appear on injection mouldings when the flow of the molten moulding composition is divided by a core and re-unites after flowing around the core.

In order to improve the compatibility of polycarbonate with polyolefins, compatibility promoters can be added to the mixtures. Epoxidised diene polymers and metal salts of carboxylic acids are employed in German Auslegeschrift No. 1,694,353, and ABS polymers in German Auslegeschrift No. 2,304,214. However, it has been found that these compatibility promoters do not significantly improve weld-line strength.

Similarly, mixtures of polycarbonates and copolymers of ethylene and vinyl monomers, for example ethylene-alkyl acrylate copolymers, of the kind described in German Offenlegungsschrift No. 2,342,214, show only a minimal improvement in compatibility and weld line strength in relation to the pure polycarbonatepolyolefin mixtures.

German Offenlegungsschrift No. 2,322,435 describes mixtures of a polycarbonate and graft polymers of mixtures of styrene and acrylonitrile and ethylene-vinyl acetate copolymers with good flow properties and improved tracking resistance. However, these mixtures also show unsatisfactory weld line strength.

Polycarbonate moulding compositions characterised by satisfactory surface homogeneity, good flow properties and a weld line strength which is sufficient for practical purposes are obtained by mixing polycarbonate with the graft polymer according to German Offenlegungsschrift No. 2,734,105.

The present invention provides mixtures of 1. from 70 to 99% by weight and preferably from 80 to 97% by weight of a predominantly aromatic polycarbonate; and
2. from 30 to 1% by weight and preferably from 20 to 3% by weight of an olefin graft polymer obtained from (a) 70 to 95% by weight and preferably 75 to 90% by weight of a graft base consisting of a homopolymer of aliphatic and/or aromatic monoolefins or of a copolymer of these olefins, with up to 50% by weight of other monoolefinically unsaturated, radically polymerisable compounds and/or up to 5% by weight of diolefins, and (b) 5 to 30% by weight and preferably 10 to 25% by weight of graft polymerizable vinyl compounds, the percentages set forth in (1) and (2) being based on the sum of components (1) and (2), the percentages set forth in the first line of (2a) and (2b) being based on the total of components (2a) and (2b) and the remaining percentages set forth in (2a) relating to the sum of the starting monomers required for the production of the graft base, the olefin graft polymers having been obtained by contacting a melt of the graft base (2a) with oxygen or an oxygen-containing gas for at most 10 minutes with intensive mixing under a pressure of from 1 to 150 bars and at a temperature of from 80° C. to 300° C., adding the vinyl compounds (2b) to be grafted on immediately afterwards with intensive mixing in the absence of oxygen or oxygen-containing gas and removing the residual monomers on completion of the graft polymerisation reaction.

Polycarbonates (component 1) suitable for the purposes of the invention are the polycondensates obtainable by reacting diphenols, particularly dihydroxy diaryl alkanes, with phosgene or diesters of carbonic acid. In addition to the unsubstituted dihydroxy diaryl alkanes, it is also possible to use those whose aryl radicals carry methyl groups or halogen atoms in the o- and/or m-position to hydroxyl groups. Branched polycarbonates are also suitable.

The polycarbonates preferably have weight-average molecular weights $\overline{M}w$ of from 10,000 to 100,000 and, more particularly, from 20,000 to 40,000, as determined by the light scattering method.

Suitable diphenols are, for example, hydroquinone, resorcinol, 4,4'-dihydroxy diphenyl, bis-(hydroxy phenyl)alkanes, for example, $C_1$–$C_8$-alkylene and $C_2$–$C_8$-alkylidene bis-phenols, bis-(hydroxy phenyl)-cycloalkanes, for example, $C_5$–$C_{15}$ cycloalkylene and $C_5$–$C_{15}$-cycloalkylidene bis-phenols, bis-(hydroxy phenyl)-sulphides, ethers, ketones, sulphoxides or sulphones; also $\alpha,\alpha'$-bis-(hydroxy phenyl)-diisopropyl benzene and the corresponding nucleus-alkylated and nucleus-halogenated compounds. It is preferred to use polycarbonates based on bis-(4-hydroxy phenyl)-2,2-propane (bisphenol A), bis-(4-hydroxy-3,5-dichlorophenyl)-2,2-propane (tetrachlorobisphenol A), bis-(4-hydroxy-3,5-dibromophenyl)-2,2-propane (tetrabromobisphenol A), bis-(4-hydroxy-3,5-dimethyl phenyl)-2,2-propane (tetramethyl bisphenol A), bis-(4-hydroxy phenyl)-1,1-cyclohexane (bisphenol Z) and polycarbonates based on trinuclear bisphenols, such as $\alpha,\alpha'$-bis-(4-hydroxy phenyl)-p-diisopropyl benzene.

Other diphenols suitable for the production of polycarbonates are described in U.S. Pat. Nos. 2,970,131; 2,991,273; 2,999,835; 2,999,846; 3,028,635; 3,062,781; 3,148,172; 3,271,367 and 3,275,601.

Polyolefins suitable for use as the polyolefin graft base (a) of the polyolefin graft polymers (component 2) required for the production of the mixtures according to the invention are any aliphatic polyolefins, for example, polyethylene, polypropylene, polybutene, and copolymers thereof, for example copolymers of ethylene and propylene. The polyolefins may also contain up to 5% by weight of residues of diolefins and up to 50% by weight of residues of radically-copolymerisable vinyl compounds, particularly those based on vinyl esters, preferably vinyl acetate, or unsaturated carboxylic acids and/or their derivatives.

Preferred graft bases are polyethylene, polypropylene, copolymers of ethylene and propylene and ethylene-vinyl acetate copolymers.

Preferred unsaturated carboxylic acids and acid derivatives are acrylic acid and methacrylic acid, their esters and amides, particularly the methyl, ethyl, n- and iso-propyl, n-, iso-, sec.- and tert.-butyl, 2-ethyl hexyl and cyclohexyl esters of these acids.

Preferred graft monomers (b) are, for example, acrylic acid, methacrylic acid, the methyl, ethyl, n- and iso-propyl, n-, iso-, sec.- and tert.-butyl, 2-ethyl hexyl and cyclohexyl esters of these acids, (meth)acrylamide, vinyl acetate, styrene, maleic acid anhydride and acrylonitrile.

Particularly preferred graft monomers are n-butyl acrylate, isobutyl acrylate, tert.-butyl acrylate, acrylonitrile and styrene.

The graft polymers used in accordance with the invention are produced by, in a first stage, reacting the polyolefin graft base in molten form with oxygen carried out with intensive mixing, preferably in an extruder, resulting in the formation of peroxide groups, and, in a second stage, graft polymerising the radically polymerisable vinyl compounds onto the polyolefin graft base, preferably carried out during the same passage through the extruder, the peroxide groups formed in the first stage providing the initiator radicals required for graft polymerisation.

In general, approximately 1000 to 10,000 ppm of active oxygen (peroxide groups) are introduced in the first stage of the grafting process. The molecular weight of the graft base does not decrease significantly during peroxide formation. The activated sites are uniformly distributed throughout the macromolecules of the graft base so that, in contrast to conventional graft polymerisation processes, numerous active sites are available. This large number of active sites results in the formation of numerous relatively short side chains in the subsequent graft polymerisation reaction.

Further information on the production of polyolefin graft polymers may be found in German Offenlegungsschrift No. 2,734,105.

The graft polymers according to the invention differ from hitherto known graft polymers, which contain one grafting site for every 20,000 to 30,000 carbon atoms and wherein the graft branches generally have an average molecular weight determined as a weight average (Mw) of from 100,000 to 1,000,000, in the fact that they contain one grafting site for every 400 to 2,000 carbon atoms and the graft branches have an average molecular weight Mw of from 2000 to 40,000.

The analysis of the polyolefin graft polymers (2) is explained, by way of example, in the following with reference to a polyethylene grafted with butyl acrylate and acrylic acid:

The polyethylene graft polymer is dissolved at an elevated temperature in a mixture of the solvents dimethyl formamide and methyl cyclohexane which separate at room temperature, followed by fractionation from homogeneous solution at 25° C.; cf. R. Kuhn, Makromolekulare Chemie 177, 1525 (1976). Butyl acrylate/acrylic acid copolymer which has not been grafted on is found in the lower phase rich in dimethyl formamide whilst ungrafted polyethylene and polyethylene grafted with butyl acrylate and acrylic acid is found in the upper phase.

The grafting yield $$\frac{C_G - C}{C_G}$$

may be determined from the quantity of ungrafted butyl acrylate/acrylic acid copolymer C and all the grafted and non-grafted butyl acrylate/acrylic acid copolymer fractions $C_G$. The grafting yields generally amount to between 50 and 90%.

Gel chromatograms (solvent: tetrahydrofuran) of the ungrafted butyl acrylate/acrylic acid copolymer are prepared, the intrinsic viscosities are determined in tetrahydrofuran and the molecular weights Mw are determined therefrom through a universal standard relation; cf. Thieme Verlag, Stuttgart, 1977. The molecular weights of the copolymer C correspond to the molecular weights of the graft branches.

The moulding compositions according to the invention may contain conventional fillers and reinforcing materials, processing aids, nucleating agents, dyes and stabilisers. In addition, they may be flameproofed using the flameproofing agents normally employed for flameproofing amorphous thermoplasts, particularly polycarbonates.

Suitable fillers and reinforcing materials are, for example, glass fibres, mica, talc, calcium metasilicate and quartz in quantities of up to 50% by weight, based on the sum of components (1) and (2). Preferred stabilisers and additives are, for example, phosphites, esters of aliphatic carboxylic acids with aliphatic polyols.

Suitable flameproofing agents are the compounds normally used for polycarbonate, for example, aromatic halogen compounds, such as decabromodiphenyl ether, tetrabromophthalic acid anhydride, salts and amides of tetrabromophthalic acid and polycarbonates containing co-condensed residues of tetrabromobisphenol A. In addition, synergistically active compounds, such as antimony trioxide, for example, may be present. The moulding compositions may also contain so-called anti-dripping agents, i.e. substances which, in the event of fire, prevent the mouldings from dripping. Substances such as these are, for example, polytetrafluoroethylene; siloxanes.

The quantity in which the flameproofing agents and antidripping agents are used should be adapted to the particular application in question. In general, a quantity of 30% by weight, based on the sum of components 1 and 2, is entirely adequate.

The mixtures according to the invention may be produced in the usual mixing units, such as kneaders, single-screw and multiple-screw extruders. Twin-screw extruders are particularly suitable.

In one particular embodiment, grafting of the polyolefin according to German Offenlegungsschrift No. 2,734,105 is carried out in the presence of a polycarbonate.

The moulding compositions according to the invention are characterised by good processing behaviour. They may be processed in standard injection-moulding machines to form mouldings characterised by satisfactory surfaces and excellent strength in the flow line. Accordingly, the mouldings are particularly suitable for the production of complicated, large-surface visible mouldings with several sprues, for example for housings of domestic appliances of all kinds.

In the following Examples, the relative solution viscosities were measured in methylene chloride at 20° C. in a concentration of 5 g/l.

EXAMPLES

A. Production of the starting materials.
I. Production of the polycarbonates (component 1)
I.1 Production of polycarbonates of 4,4'-dihydroxydiphenyl-2,2-propane 454 g of 4,4'-dihydroxy diphenyl-2,2-propane and 9.5 g of p-tert.-butyl phenol were suspended in 1.5 litres of water. In a three-necked flask equipped with a stirrer and gas inlet pipe, the oxygen was removed from the reaction mixture by passing nitrogen through it with stirring for 15 minutes. 355 g of a 45% sodium hydroxide solution and 1000 g of methylene chloride were then added. The mixture was cooled to 25° C. 237 g of phosgene were then added over a period of 120 minutes during which time the temperature of 25° C. was maintained by cooling.

An additional quantity of 75 g of a 45% sodium hydroxide solution was added after 15 to 30 minutes or after the uptake of phosgene had begun. 1.6 g of triethylamine are added to the resulting solution and the mixture was stirred for another 15 minutes. A highly viscous solution was obtained, its viscosity being regulated by the addition of methylene chloride. The aqueous phase was separated off and the organic phase was washed free from salt and alkali with water. The polycarbonate had a relative viscosity of 1.29, as measured in a 0.5% solution of methylene chloride at 20° C. This corresponded approximately to a molecular weight of 32,000. The polycarbonate thus obtained was extruded and granulated.

I.2 Production of polycarbonate of 4,4'-dihydroxy diphenyl-2,2-propane and 4,4'-dihydroxy-3,3,3',3'-tetramethyl diphenyl-2,2-propane.

A mixture of 90 mole percent of 4,4'-dihydroxy diphenyl-2,2-propane and 10 mole percent of 4,4'-dihydroxy-3,3,3',3'-tetramethyl diphenyl-2,2-propane was used as in Example I.1.

The polycarbonate obtained had a relative viscosity of 1.32.

II Production of the graft polymers (component 2)

The production conditions and properties are set out in Tables 1a and 1b. Further explanations are given in the following:

Graft polymers II.1 and II.2 (grafting onto high-pressure polyethylene)

The graft polymers II.1 and II.2 mentioned in Tables 1a and 1b, which are based on a high-pressure polyethylene having a melt index (190/2) of 7.1 g/10 mins. (DIN 53 735), were produced in a twin-screw extruder equipped with self-cleaning screws 57 mm in diameter and 41 D in length rotating in the same direction. The compression of the melt was achieved by a left-hand thread, increases in lead and kneading blocks offset to the left in the two variable screws. 400 liters/hour of air were introduced into the induction zone under a pressure of from 100 to 130 bars and 1200 liters/hour of air into the oxidation zone under a pressure of from 70 l to 90 bars. The graft monomers were introduced into the polymerisation zone under a pressure of from 15 to 18 bars.

TABLE 1a

| | Production of the polyolefin graft polymers | | | | |
|---|---|---|---|---|---|
| Graft Product | | II.1 | II.2 | II.3 | II.4 | II.5 |
| Throughput | kg/h | 75 | 80 | 0.9 | 1.05 | 2.5 |
| Screw speed | r.p.m. | 100 | 107 | 110 | 100 | 25 |
| Average residence time | mins. | 2.3 | 2.1 | 6 | 6 | — |
| Peroxide content after oxidation | ppm | 1000 | 1200 | 1200 | 1200 | 1150 |
| Mooney value* after oxidation | | — | — | 45 | 44 | — |
| MFI+ 190° C. after oxidation | g/10 mins. | 7.3 | 7.8 | — | — | — |
| Monomer input | Kg/h | 11.3 | 4.5 | 0.12 | 0.195 | 0.25 |
| Monomer composition | | 20% AS 80% n-BA | 100% t-BA | 72% S 28% AN | 100% n-BA | 28% AN 72% S |
| Conversion | % | 80 | 89 | 99 | 87 | 64 |
| Product composition | | 1.1% AS 11% n-BA | 5% t-BA | 11% S 4% AN | 16% n-BA | 1.8% AN 4.6% S |
| Residual peroxide content | ppm | 300 | 250 | 600 | 540 | 380 |
| Mooney value* graft product | | — | — | 47 | 20 | 13 |
| MFI+ at 190° C. graft product | g/10 mins. | 2.4 | 5.0 | — | — | — |

Explanation of abbreviations:
The percentages are % by weight
AN acrylonitrile
AS acrylic acid
n-BA n-butyl acrylate
t-BA tert. butyl acrylate
S styrene
+Melt Flow Index according to DIN 53 735, as measured at 190° C./216 Kp load measuring nozzle: 2.055 mm diameter, length: 8 mm
*L 4 (100° C.)

TABLE 1b

| Screw conditions in the production of the polyolefin graft polymers | | | |
|---|---|---|---|
| Graft products | | II.1 | II.2 |
| Feed zone | 2 D | 86° | 85° |
| Melting zone | 4 D | 140° | 140° |
| Compression zone | 1 D | 200° | 205° |
| Induction zone | 3 D | 220° | 225° |
| Oxidation zone | 6 D | 210° | 210° |
| Compression zone | 1 D | 200° | 200° |
| Degassing zone | 2 D | 190° | 190° |
| Compression zone | 1 D | 200° | 200° |
| Polymerisation zone | 11 D | 210° | 210° |
| Compression zone | 1 D | 210° | 210° |
| Evaporation zone | 6 D | 220° | 220° |
| Extrusion zone | 3 D | 200° | 200° |
| | 41 D | | |
| | | II.3 | II.4 |

TABLE 1b-continued

Screw conditions in the production of the polyolefin graft polymers

| Feed zone | 2 D | 110° | 110° |
|---|---|---|---|
| Melting zone | 5 D | 190° | 190° |
| Compression zone | 2 D | 200° | 200° |
| Induction zone | 3 D | 255° | 235° |
| Oxidation zone | 6 D | 210° | 210° |
| Compression zone | 2 D | 210° | 210° |
| Degassing zone | 4 D | 190° | 190° |
| Compression zone | 2 D | 200° | 190° |
| Polymerisation zone | 8 D | 210° | 190° |
| Compression zone | 2 D | 210° | 190° |
| Evaporation zone | 7 D | 200° | 190° |
| Extrusion zone | 5 D | 200° | 190° |
|  | 48 D |  |  |

|  |  | II.5 |
|---|---|---|
| Feed zone | 2 D | 60° |
| Melting zone | 4 D | 120° |
| Compression zone | 1 D | 120° |
| Induction zone | 2 D | 210° |
| Oxidation zone | 5 D | 180° |
| Compression zone | 1 D | 120° |
| Degassing zone | 2 D | 100° |
| Compression zone | 1 D | 120° |
| Polymerisation zone | 10 D | 160° |
| Compression zone | 1 D | 160° |
| Evaporation zone | 6 D | 190° |
| Extrusion zone | 3 D | 200° |
|  | 38 D |  |

The temperatures are quoted in degrees Centigrade.

Graft polymers II.3+II.4 (grafting onto ethylenepropylene copolymer):

The grafting of styrene and acrylonitrile or n-butyl acrylate onto Buna®AP 407 (an ethylenepropylene rubber manufactured by Buna-Werke Huls) was carried out in a contra-rotating twin-screw extruder of the Point Eight Type manufactured by Messrs. Welding Inc. with screws 20 mm in diameter and 48 D in length under the conditions set out in Tables 1a and 1b (graft products II.3 and II.4). The compression of the melt was achieved by the increase in the core diameter of the screws in the compression zones. The screws had a lead of 1 D over their entire length.

80 liters/hour of air were introduced into the induction zone under a pressure of from 40 to 60 bars and 240 liters/hour of air into the oxidation zone under a pressure of from 20 to 40 bars. The graft monomers were introduced into the polymerisation zone under a pressure of 5 bars. The unreacted monomers were then evaporated and the product was extruded in the form of a strand and then granulated.

Graft polymer II.5 (grafting onto ethylene-vinyl acetate copolymer):

The grafting of styrene and acrylonitrile onto an ethylene-vinyl acetate copolymer (45% by weight of vinyl acetate, melt index (190/2.16) 4.2 g/10 mins. according to DIN 53 735) was carried out in a twin-screw extruder having self-cleaning variable screws 32 mm in diameter and 38 D in length rotating in the same direction. The compression of the melt was achieved by a left-hand thread, increases in lead and kneading blocks offset to the left in the two variable screws. The throughput amounted to 2500 g per hour for a screw speed of 25 r.p.m. 100 liters/hour of air were introduced into the induction zone under a pressure of 30 bars and 300 liters/hour of air into the oxidation zone under a pressure of 20 bars. 250 g/hour of a mixture of 28 parts of acrylonitrile and 72 parts of styrene were introduced into the polymerisation zone under a pressure of 2 bars. The conversion amounted to 64%. The graft product contained 1.8% of acrylonitrile and 4.6% of styrene. After the oxidation zone, the melt contained 2500 ppm of active oxygen. The Mooney value amounted to 13.

The lengths and temperatures of the extruder zones are shown in Table 1b.

III. Production of a graft polymer of styrene and acrylonitrile on an ethylene-vinyl acetate copolymer (for comparison):

In accordance with German Offenlegungsschrift Nos. 2,215,588 and 2,305,681, a mixture of 900 g of an ethylene/vinyl acetate copolymer containing 45% by weight of vinyl acetate (as in Example II.5), 28 g of acrylonitrile, 72 g of styrene, 35 g of allyl acetate and 1.5 kg of tert.butanol was introduced under nitrogen into a 5-liter autoclave. In addition, 40 g of propylene were introduced under pressure. A solution of 3 g of dibenzoyl peroxide in a mixture of 30 g of allyl acetate and 100 g of t-butanol was then pumped in in portions with stirring over a period of 7 hours at a temperature of 85° C. After stirring for another 10 hours at 85° C., the tert.-butanol and the residual monomers were distilled off with steam and the residual graft polymer was dried. 91.3% by weight of the graft polymer consisting of an ethylenevinyl acetate copolymer and 8.7% by weight of a styreneacrylonitrile copolymer.

The graft polymer had a melt index of 2.3 g/10 mins. (190° C./2.16 kg).

B. Production of the mixtures of the graft polymers and the polycarbonates (Examples IV to XIII):

The polyolefin graft polymers and comparison products were incorporated into polycarbonate in a ZSK 32 twin-screw extruder at temperatures in the range from 260° C. to 280° C.

The production, composition and properties of the mixtures are set out in Table 2.

To determine flow line strength, standard small test bars (4×6×50 mm) were injected from both ends. The injection mouldings had a weld line situated approximately in the middle. The impact strength of test bars, such as these as determined in accordance with DIN 53 435, is known as the weld line strength.

TABLE 2

Production, composition and properties of the mixtures of polycarbonates and olefin graft polymers

| Example No. | Graft polymer type | % by weight | Polycarbonate type | % by weight | Melt temp. °C. | Melt index g/10 mins 1 | Notched impact strength kJ/m² 2 | Flow line strength kJ/m² |
|---|---|---|---|---|---|---|---|---|
| IV | high pressure polyethylene(x) | 10 | I.1 | 90 | 275 | 23.8 | 23.5 | 3.6 |
| V | lupolen® A 2710 HX | 10 | I.1 | 90 | 275 | 21.2 | 24.6 | 4.3 |
| VI | III | 10 | I.1 | 90 | 273 | 22.9 | 25.3 | 5.1 |

TABLE 2-continued

Production, composition and properties of the mixtures of polycarbonates and olefin graft polymers

| Example No. | Graft polymer type | Graft polymer % by weight | Polycarbonate type | Polycarbonate % by weight | Melt temp. °C. | Melt index g/10 mins 1 | Notched impact strength kJ/m² 2 | Flow line strength kJ/m² |
|---|---|---|---|---|---|---|---|---|
| VII | II.1 | 10 | I.1 | 90 | 271 | 23.1 | 31.7 | 8.5 |
| VIII | II.1 | 5 | I.1 | 95 | 275 | 17.5 | 27.3 | 10.4 |
| IX | II.2 | 10 | I.2 | 90 | 278 | 22.3 | 29.8 | 7.8 |
| X | II.3 | 10 | I.1 | 90 | 275 | 19.7 | 32.1 | 9.2 |
| XI | II.3 | 20 | I.1 | 80 | 263 | 35.2 | 36.2 | 8.7 |
| XII | II.4 | 10 | I.1 | 90 | 278 | 21.5 | 28.7 | 8.5 |
| XIII | II.5 | 10 | I.2 | 90 | 275 | 22.8 | 29.5 | 9.7 |

1 According to DIN 55 735, 300° C., 1.2 kp load
2 According to DIN 55 453
Lupolen A 2710 HX is a copolymer of ethylene and n-butyl acrylate manufactured by BASF
x melt index (190/2) 7.1 g/10 mins.

We claim:

1. A mixture comprising
(1) from 70 to 99% by weight of a predominantly aromatic polycarbonate and
(2) from 30 to 1% by weight of a polyolefin graft polymer of
   (a) 70 to 95% by weight of polyethylene as grafting base and
   (b) 5 to 30% by weight of at least one graft-polymerizable vinyl compound, the percentages set forth (1) and (2) being based on the sum of components (1) and (2), and the percentages set forth in (2a) and (2b) being based on the total of components (2a) and (2b), the polyolefin graft polymer having been obtained by contacting a melt of the graft base (2a) with oxygen or an oxygen-containing gas for up to 10 minutes with intensive mixing under a pressure of from 1 to 150 bars and at a temperature of from 80° to 300° C., adding the graft-polymerizable vinyl compound (2b) to be grafted immediately afterwards with intensive mixing in the absence of oxygen or an oxygen-containing gas and removing residual monomers after graft polymerization.

2. A mixture according to claim 1 which comprises from 80 to 97% by weight of said predominantly aromatic polycarbonate.

3. A mixture according to claim 1 or 2 which comprises from 20 to 3% by weight of the polyolefin graft polymer.

4. A mixture according to claim 1 wherein the polyolefin graft polymer contains from 75 to 90% by weight of polyethylene as the graft base.

5. A mixture according to claim 1 wherein the polyolefin graft polymer contains 10 to 25% by weight of said graft-polymerizable vinyl compound.

6. A mixture according to claim 1 wherein the polycarbonate consists of at least one member selected from the group consisting of bis-(4-hydroxyphenyl)-2,2-propane, bis-(4-hydroxy-3,5-dibromophenyl)-2,2-propane and bis-(4-hydroxy-3,5-dimethylphenyl)-2,2-propane.

7. A mixture according to claim 1 wherein said graft-polymerizable vinyl compound is selected from the group consisting of acrylic acid, methacrylic acid, the methyl, ethyl, propyl, butyl, 2-ethyl hexyl esters of said acids, acrylamide, methacrylamide, vinylacetate, styrene, maleic acid anhydride and acrylonitrile.

* * * * *